Patented Oct. 13, 1936

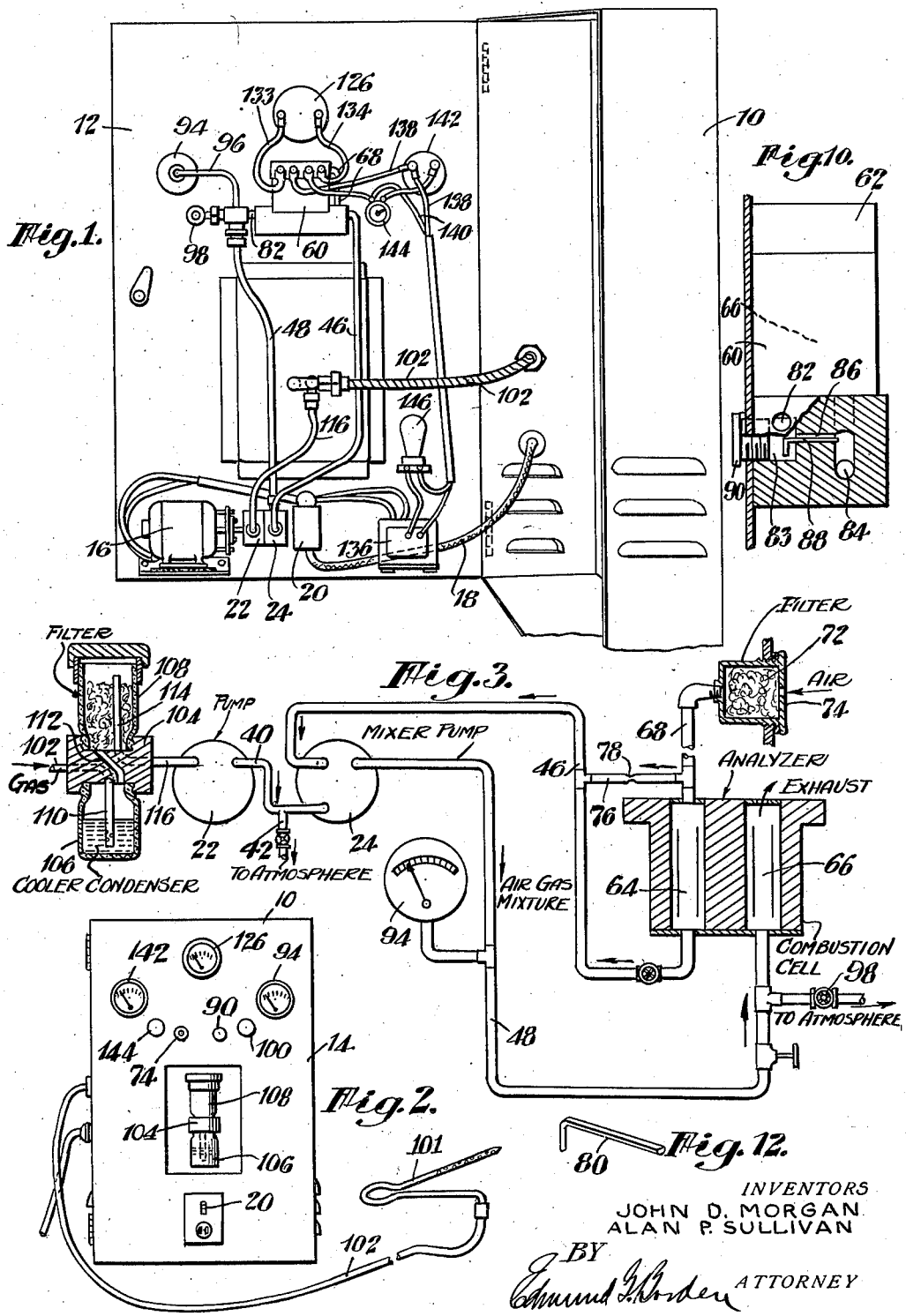

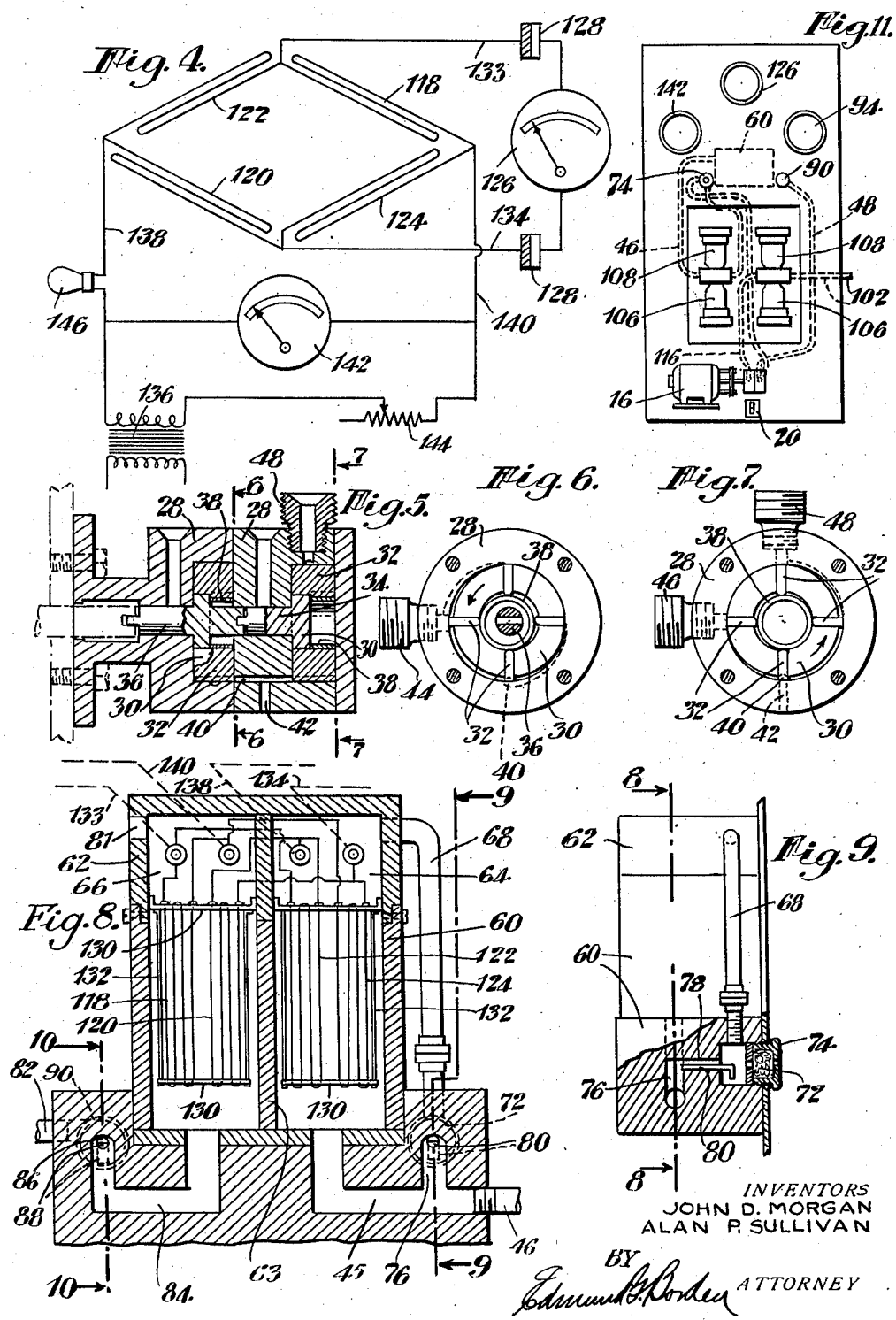

2,057,246

UNITED STATES PATENT OFFICE 2,057,246

GAS ANALYZING PROCESS AND APPARATUS

John D. Morgan, South Orange, N. J., and Alan P. Sullivan, Long Island City, N. Y., assignors to Doherty Research Company, New York, N. Y., a corporation of Delaware Application November 26, 1932, Serial No. 644,424

5 Claims. (Cl. 23—255)

The present invention relates to the quantitative measurement of the combustible components of gaseous mixtures such as those produced in domestic and industrial combustion operations. It has special utility in the evaluation of combustibles present in exhaust gases from internal combustion engines of the automotive type wherein hydrocarbon fuels are burned under conditions of underventilation. The invention is broadly concerned with the measurement of combustibles by a process involving the catalytic combustion within a combustion cell of such gases, with or without the prior admixture therewith of a combustion-supporting fluid.

It is well known that the exhaust gases from an internal combustion motor flow from the latter under a wide range of pressures and temperatures depending upon the conditions of operation of the motor. The accuracy of the measuring instrument for the combustibles involving the use of catalytic elements is dependent in considerable extent upon the careful control of the rate of flow over the catalytic element of the gases to be analyzed, and the securing of a uniform proportioning of the gas and air in the mixture to be examined, regardless of variations in the temperature and pressure of the gas mixture flowing from the motor. Under certain conditions it is important to maintain a uniform humidity in the gas mixture flowing to the combustion cell of this type of gas analyzer in the interests of accuracy.

Among the more important objects of the present invention are:

To provide in an improved manner for controlling the flow under pressure of air or of a gas-air mixture through an analyzer cell while preventing unregulated pressure variations; to provide a novel portable gas analyzer of the combustion type adapted for use with alternating currents of varying potential; to provide a novel gas analyzer of the combustion type wherein both the gas to be analyzed and the air are brought to approximately the same temperature and degree of humidity before their introduction into the analyzer cell; and to provide a gas analyzer of the combustion type in which the accuracy of the measurement of combustion efficiency is not affected by substantial variations in the power operating the fluid flow-inducing means. These and other objects will be apparent in the course of the subsequent description of the invention.

Broadly considered, the invention involves a gas analyzer of the thermal conductivity or combustion type which, after calibration and adjustment, is fully automatic and may be readily employed for measuring the combustion efficiency of motors by the average gasoline filling station attendant or motor car operator without necessitating the manual regulation of any instrument valves by the operator. Important apparatus elements of the invention include a source of either A. C. or D. C. current, a multi-stage pump or its equivalent, preferably of unitary design, scrubbers and dry filters for the gas,—and preferably also for air when the latter is used,—a pair of analyzer cells having therein catalytic elements disposed in a Wheatstone bridge circuit or its equivalent, and certain fluid-pressure and flow-regulators and electric current-regulating means hereinafter described.

The invention will now be described more specifically in connection with the accompanying drawings which illustrate certain practical embodiments thereof.

In the drawings,

Fig. 1 is a perspective view showing the rear of an instrument panel of a portable gas analyzer unit, parts being cut away;

Fig. 2 is a front view of the instrument panel of Fig. 1;

Fig. 3 is a somewhat diagrammatic view of the fluid flow circuit illustrating one modification of the invention;

Fig. 4 is a diagram of the wiring arrangement utilized in the modification shown in Figs. 1 and 2;

Fig. 5 is a vertical section taken longitudinally through the pump assembly;

Fig. 6 is a vertical section taken on the lines 6—6 of Fig. 5; looking in the direction of the arrows;

Fig. 7 is a vertical section taken on line 7—7 of Fig. 5 looking in the direction of the arrows;

Fig. 8 is a vertical section through the analyzer cell and associated parts taken along line 8—8 of Fig. 9, looking in the direction of the arrows;

Fig. 9 is a vertical section taken along the line 9—9 of Fig. 8, looking in the direction of the arrows;

Fig. 10 is a vertical section taken along the line 10—10 of Fig. 8, looking in the direction of the arrows;

Fig. 11 is a front elevation of a modified instrument panel; and

Fig. 12 is a perspective view of a flow-regulating member.

Referring now to the drawings, numeral 10 designates a portable container, preferably of sheet metal, which may be provided if desired with a carrying handle. The container shown in Fig. 1 has a hinged door 12, the outer face 14 of which serves as an instrument panel. The container sides have louvres for ventilation purposes.

The apparatus comprises a motor 16 mounted on rubber and driven by power flowing thereto through electric conduit 18, controlled by switch 20. Operatively connected with the shaft of motor 16 are two coacting positive pressure rotary blowers or pumps 22, 24 mounted as a unit and supported by the motor. The pumps 22, 24 are of well-known type, each comprising a cylindrical casing 28 having eccentrically mounted for rotation therein a slotted rotor 30, in the said slots of which are mounted detachable rotor blades 32 for free sliding movement toward and away from the said casing wall. The rotors 30 of the respective pumps have interconnected shafts 34, 36 for concurrent operation of the pumps by the motor 16. The respective pumps may be of the same or different capacity. A metal spacing and equalizing ring 38 freely floats around the shaft of each rotor 30 in a central space provided therefor and is adapted continuously to contact with the inner end of each rotor blade 32. The size of the ring is such that as the rotor of each pump revolves, the outer end of each blade is maintained in sliding contact with the casing wall.

The space between the inner wall of the casing 28 and the outer surface of the rotor of pump 22 communicates with the similar space of pump 24 through a channel 40 as shown, whereby fluids are forced by pump 22 to the pump 24. A second unobstructed channel 42 establishes permanent communication between the channel 40 and the outer atmosphere for the purpose of permitting free discharge from the pumping system of fluids in excess of that moving to the pump 24. Pump 22 is provided with a fluid inlet 44 which in the form shown is at an angle of 270° to the outlet channel 40, measured in the direction of rotation of the rotor 30. Pump 24 has leading thereto, in addition to the fluid inlet channel 40, a second fluid inlet line 46 and a fluid outlet line 48, as shown. Pump 24 functions to continuously mix regulated proportions of the gas to be measured and a combustion-supporting gas such as air, which mixture is discharged at a uniform regulated pressure from the pump outlet.

Mounted upon the rear face of the door 12 is an analyzer cell block or housing 60, preferably of metal, the same having a fluid-tight metal cover 62,—the housing being divided by partition 63 into two separate non-communicating compartments or cells 64 and 66. The compartment 64 is in permanent communication with the outer air thru a conduit 68, and an air filter 72. The latter has an apertured removable cover member 74 mounted on the panel 12 and adapted to be filled with a loose packing of cotton, glass wool, or other dry filtering medium. Conduit 68 has a pipe coupling in it for quick removal of the cover 62. The lower end of the compartment 64 is in permanent communication with the inlet of pump 24 through channel 45 and pipe 46. Air conduit 68 also directly communicates with the channel 45 through a branch 76 having therein a flow-regulating device. The latter comprises an orifice-conduit 78 having therein a freely rotatable and slidable longitudinally grooved orifice member 80, the latter having an end thereof curved for convenience in removing it for cleaning purposes and in exchanging one regulating member 80 for another. The arrangement of parts is such that by properly selecting the apertured member 80 it is readily possible to adjust the relative proportion of the incoming air respectively drawn by pump 24 through the analyzer compartment 64 and that drawn directly through the flow-regulating orifice conduit 78 directly to the line 46 so as to by-pass compartment 64.

The upper end of analyzer compartment 66 has an outlet passage 81 therein. The lower end of analyzer compartment 66 is in permanent controlled communication with the gas mixture outlet line 48 from pump 24 through branch conduit 82, the space 83, and channel 84 having therein a flow-regulating orifice 86 and a removable flow-regulating member 88 similar in construction to the orifice conduit 78 and regulating member 80. A fluid-tight threaded cover member 90 seals the flow-regulating member 88 from the outer air while at the same time permits ready access to it.

The pump offtake line 48 is also in permanent communication with a fluid pressure gauge 94 through line 96; and is connected with a pressure-regulating valve 98, controlled by a knob 100 mounted on the front of the door 12.

For conducting to the pump 22 the exhaust gas mixture to be examined while concurrently cooling the latter and removing condensible vapors and solid impurities therein, a curved apertured sampling device 101 having an apertured portion adapted for insertion into a motor exhaust pipe, is connected through fluid tight flexible tubing 102 with a combination gas scrubber and dry filter consisting of a metal supporting member 104 upon the bottom portion of which a glass vessel 106 is removably mounted while providing a gas-tight seal with the support 104. A second glass vessel 108 is removably mounted upon the support 104 and provides a gas-tight seal with the latter. The outlet end of the conduit 102 communicates with the lower portion of the vessel 106 below the level of water or other suitable liquid therein by means of conduit 110. The two vessels are in permanent communication through a channel 112 in the supporting member 104. A conduit 114 connects the upper part of the vessel 108 with a line 116 leading to the inlet of pump 22. The construction of the sampling device 100 and of the gas scrubber and dry filter are more particularly described in the co-pending application of John D. Morgan, Serial No. 482,283 filed September 16, 1930.

Mounted within the cover 62 of the analyzer cell block and projecting downwardly therefrom into the tubular channels or compartments 64, 66, are respective pairs of catalytic elements 118, 120, and 122, 124. These preferably are in the nature of thin wires of platinum, or platinum alloys such as a platinum-iridium alloy, though other well-known catalytic metals or alloys of the type known to catalyze complete combustion reactions may be used. Both catalytic elements of each pair are mounted in the same compartment,—the four wires being interconnected in a Wheatstone bridge circuit having therein a galvanometer 126. Dry rectifiers 128, 128 of well known construction also are used, for converting alternating current to direct current where alternating current is supplied to the unit and where a direct current indicating galvanometer is in use. In the modification shown in Fig. 8, each of the elements 118, 120, 122, and 124 consists of a pair of small elongated loops, the ends of which are carried in spaced relation upon small strips of transite or other insulator 130, the latter of which is secured to the under part of the cover 62 in such manner as not to obstruct the free passage of fluids through compartments, 64, 66. Rigid wires 132 separate the lower transite strip from the upper one, and maintain the various elements in properly spaced relationship. The catalyst wires are connected with the galvanometer through the lines 133, 134. Electric current for energizing the catalytic wires flows from a transformer 136 through the wires 138, 140,—the circuit containing the same having therein an ammeter 142, a rheostat 144, and a resistance in the form of a carbon filament lamp or amperite 146, adapted to maintain a constant voltage in the circuit energizing the catalytic wires irrespective of variations in the current induced in the transformer by the line current.

The sample of gas mixture flowing through the compartment 66 of the analyzer cell when the apparatus is in use is extremely small. It has been found therefore that the liquid in the vessel 106 greatly assists not only in maintaining the already cooled gas at a substantially uniform temperature but also in maintaining the same at a uniform humidity throughout the operation.

Under certain conditions it is also desirable to bring the air flow through compartment 64 of the cell to the same relative humidity and temperature as the exhaust gases flowing through compartment 66 thereof. For this purpose, the construction shown in Fig. 11 may be used, and provides for the use of two fluid scrubbers and dry filters of the type already described. One of these has its inlet end connected to the gas sample line 102; the other has inlet and outlet ends in communication respectively with the conduit 70 and with the upper part of compartment 64,—the conduit 68 being then eliminated. The air drawn into the system in bubbling through the liquid vessel 106 has its humidity adjusted in the same manner as the gas sample.

In the modification shown in Fig. 3, all of the air drawn into the system passes through the comparitor cell 64,—the amount thereof being adjusted by regulation of the valve in line 46 and by the suitable design of pump 24. The amount of air-gas mixture flowing to cell 66 is controlled by the regulating valve 98 and the valve in line 48.

The operation of the instrument described above will now be described particularly in connection with the analysis of motor exhaust gases for their combustible constituents. When this is done the end of the sampling device 101 is inserted into the exhaust pipe leading from the motor, the combustion efficiency of which is to be determined. Then the switch 20 on the instrument panel is closed thus causing the motor 16 to function and current to flow through the Wheatstone bridge circuit. Action of the pump 24 serves to draw air thereto through the filtering material 72 and line 46. The orifice 78 is of such size that a substantial portion of the air drawn into the system uniformly passes through conduit 68 and compartment 64 of the analyzer block, the remainder of the air flowing through the orifice 78 directly to the conduit 46. At the same time, a sample of the gas mixture to be analyzed is drawn under action of the pump 22, through conduit 102, the scrubber 106, dry filter 108, and conduit 116 to the inlet of pump 22. The filtered gas mixture is forced through channel 40 directly to the adjacent pump 24, in part by pressure of the pump 22 and in part by suction of the pump 24. The channels 42 leading from the channel 40 to the atmosphere is of such size that the gas mixture flowing to pump 24 is at approximately atmospheric pressure at all times. As the pump rotor moves through a cycle, a small sample of the exhaust gases is drawn into the pump during a short period of the time of such movement. Subsequently thereto a regulated supply of air is drawn into the pump through the line 46 and is quickly and thoroughly mixed therein with the exhaust gases present. At a subsequent part of the rotor cycle this mixture of exhaust gases and air is expelled through line 48 and thence flows into and thru compartment 66 of the analyzer housing and to the atmosphere through the aperture 81 in the upper part of that compartment. The valve 98 is adjusted to release any excess pressure which may be developed by the pump in excess of that at which the analyzer has been calibrated to function, the pressure being shown by gauge 94. The flow-regulating member 88 makes it possible to adjust the amount of gas mixture flowing over the active catalyst elements in compartment 66 to that found most suitable for the conditions of operation employed. The pressure regulating valve 98 permits the maintenance of uniform pressure conditions in the line leading to compartment 66, independently of the adjustment of the flow-regulating member or of substantial changes in the speed of pump 24. The rheostat 144 in the Wheatstone bridge circuit serves to adjust the current flowing through the electric circuit to that producing the desired temperature in the catalytic elements, in preparation for the analysis of the gas mixture. Preferably in the examination of motor exhaust gases employing this type of gas analyzer, a positive pressure equivalent to 4 inches of water is maintained upon the gas mixture flowing through the analyzer compartment 66,—although obviously this is not essential to the practice of the invention.

It will be noted that the arrangement of parts is such that the exhaust gas mixture flowing to the inlet of pump 24 is maintained at approximately atmospheric pressure regardless of the usual wide variations in pressure existing in the motor exhaust pipe and in lesser degree in the line leading from the latter to the sampler pump 22.

This instrument as shown can be in the form of a small compact unit which is readily portable from place to place and is of distinct value for checking the calibration of non-portable gas analyzers operating on the catalytic combustion principle and located at widely spaced points. Accurate uniform combustion efficiency readings are readily obtainable even under conditions where the amount of gas sample flowing to the pump 28 substantially changes, due to variations in the current driving the motor 16. The analyzer cell 64 and comparitor cell 66 assembly of the present invention forms a compact, readily-portable demountable unit, so that any replacement of the delicate catalytic elements of the Wheatstone bridge circuit can be made easily by an unskilled workman,—by exchanging a new unit,—comprising the cover 62 and the inner wiring which is integral therewith,—for the old one.

Causing air to flow through the catalytic elements in compartment 64 during operation of the unit eliminates or minimizes the variable effects on the Wheatstone bridge circuit of convection currents such as may occur in the usual sealed comparitor cell, since the slow-moving air current continually and uniformly wipes heat from these wires in cell 64.

The elements 122, 124 need not be catalytic elements, since no combustion occurs in compartment 64. These wires therefore may be of a base metal or alloy,—or they may be of a non-catalytic metal such as gold.

The pump 24, the gas inlet channel 40, and the air inlet from line 46 preferably are designed to deliver from pump 24 a gas mixture consisting of substantially equal parts of air and of the exhaust gas mixture. Other proportioning of air to the exhaust gas of course may be utilized when desired, as will be obvious to those skilled in the art.

The invention provides for the maintenance of a uniform regulated flow of a standard fluid (air has been indicated as the standard fluid in connection with one modification for purposes of illustration only) over two legs of a Wheatstone bridge circuit, independently of substantial variations in the force applied to induce such flow. It further provides independently for the maintenance of a uniform regulated flow of the gas mixture containing combustible to be examined over the two other legs of the Wheatstone bridge circuit.

The invention is effective for the analysis of exhaust gases from internal combustion motor operations and the like in which the fuel employed contains metallo-organic compounds such as tetra ethyl lead. Any lead oxide (PbO) or other objectionable decomposition products of the tetra ethyl lead are rendered innocuous and do not injure the catalyst nor noticeably shorten its life. This may be ascribed in part to the efficacy of the dry filter and in part to the substantial dilution effect by the air of the filtered cooled exhaust gases.

An important feature of the invention is the design of a small compact analyzer cell housing having complete Wheatstone bridge wiring rigidly mounted in a readily demountable cover for the said housing,—the construction of parts being such that the various legs of the Wheatstone bridge circuit project from the cover in the form of two groups of wires,—the wires of the respective groups being in alignment with passageways in the corresponding cells 64, 66. Thus by placing the cover into position, the various bridge wires are thereby placed in proper spaced relation with the walls of these cells. The proper binding posts on the outside of the cover are then quickly and easily connected with the electric circuit and galvanometer.

While in one modification shown, the gas analyzing apparatus is mounted upon the door 12 for convenience of assembly, other arrangements of parts are of course within the purview of the invention.

In the examination of waste gases and particularly of exhaust gases from an internal combustion engine, the current flowing through the Wheatstone bridge circuit generally is selected to maintain the catalytic wires in the compartment 66 at a temperature within the range from 950° to 1380° F.,—and preferably from 1120° to 1380° F.,—when immersed in air. Obviously, however, this current may be so low as just to maintain the catalytic element in active condition; and the upper limit of such current is that at which temperatures are developed at which the catalytic element fuses.

As indicated in Fig. 3, the pumps 22 and 24 may be independently driven if desired; and of course they can be located in different housings. Likewise, other forms of pressure-regulating valves, and flow-regulating orifice members may be substituted for those herein described.

The invention is susceptible of modification within the scope of the appended claims.

We claim:

1. A gas analyzer unit comprising an analyzer cell, a comparitor cell, a combined pump and mixing chamber, pressure means for introducing a gas mixture containing combustibles at a uniform regulated pressure to the said pump, means connected with the said pump for conducting air through the comparitor cell and to the pump, a conduit adapted to conduct air directly to the pump by-passing the comparitor cell, and an outlet conduit connecting the pump with the analyzer cell.

2. A gas analyzer unit comprising an analyzer cell, a comparitor cell, a combined pump and mixing chamber, means for introducing to the said pump at a uniform substantially atmospheric pressure a uniform supply of the gas to be analyzed, means connected with the pump for independently conducting through the comparitor cell and to the pump a regulated supply of air from a source thereof at substantially atmospheric pressure, and an outlet conduit connecting the pump with the analyzer cell and having therein a flow-controlling device.

3. A gas analyzer unit comprising an analyzer cell, a comparitor cell, a unitary housing for the said cells including a quick detachable fluid-tight cover having mounted thereon catalytic elements interconnected to form the respective legs of a Wheatstone bridge circuit, the said legs being grouped in pairs and adapted to project into the respective cells when the cover is in place thereon, means for energizing the said circuit, means compensating for substantial variations in the circuit-energizing means, a sampling pump having a suction conduit to which gas to be analyzed is supplied, a mixing pump connected by a suction conduit with the outlet from the sampling pump, a pressure-limiting device operatively interposed in the conduit connecting the pumps, a conduit for conducting air directly to the mixing pump, a second valved conduit adapted to direct a regulated portion of air through the comparitor cell to the mixing pump, and means having therein a flow-controlling member connecting the mixing pump with the analyzer cell.

4. A process of analyzing the combustible content in a gas, which comprises continuously pumping measured quantities of the gas to be analyzed and air separately into a mixing chamber to give a mixture of constant quantity having a definite proportion of gas and air, heating a wire of catalyzing material in a confined space electrically, conducting a portion of said mixture to and through said space, discharging a portion of said mixture to the atmosphere at a point intermediate the mixing chamber and said space, concurrently pumping a stream of air at a regulated rate over a second electrically heated catalytic wire, and measuring variations in the electrical resistances of the respective catalytic wires thus produced as a gauge of the amount of combustible content in the gas.

5. A process of analyzing the combustible content in a gas, which consists in continuously pumping measured quantities of the gas to be analyzed and air separately into a mixing chamber to give a mixture of constant quantity having a definite proportion of gas and air, heating a wire of catalyzing material in a confined space electrically, conducting a portion of said mixture to and through said space, discharging a portion of said mixture to the atmosphere at a point intermediate the mixing chamber and said space, and measuring the conductivity of the wire as a gauge of the amount of combustible content in the gas.

JOHN D. MORGAN.
ALAN P. SULLIVAN.